(12) United States Patent
Lawrence et al.

(10) Patent No.: US 6,315,367 B1
(45) Date of Patent: Nov. 13, 2001

(54) LIGHT WEIGHT CAST WHEEL AND APPARATUS FOR CASTING SAME

(75) Inventors: Garth Lawrence, Farmington Hills; John D. Nitz, Ypsilanti; Douglas P. Mason, Livonia; Romulo A. Prieto; Michael McGrath, both of Romulus, all of MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/607,797

(22) Filed: Jun. 30, 2000

Related U.S. Application Data

(63) Continuation of application No. PCT/US98/27817, filed on Dec. 30, 1998.
(60) Provisional application No. 60/070,022, filed on Dec. 30, 1997.

(51) Int. Cl.[7] .................................................. B60B 1/06
(52) U.S. Cl. ............................ 301/65; 301/63.1; 301/97
(58) Field of Search ........................... 301/65, 63.1, 95, 301/96, 97, 98; 164/113, 114, 132, 64

(56) References Cited

U.S. PATENT DOCUMENTS

| | | | |
|---|---|---|---|
| 1,699,120 | * 1/1929 | Reinhard | 301/65 |
| 3,856,360 | * 12/1974 | Lindberg et al. | 301/65 |
| 4,105,255 | * 8/1978 | Kopp | 301/97 |
| 4,165,131 | * 8/1979 | Thompson | 301/65 |
| 4,420,190 | * 12/1983 | Rohr | 301/65 |
| 4,436,133 | * 3/1984 | Rohr | 301/65 |
| 4,861,113 | * 8/1989 | Imamura et al. | 301/65 |
| 5,292,182 | * 3/1994 | Kanazawa et al. | 301/65 |
| 5,311,918 | * 5/1994 | Scott | 164/114 |
| 5,319,118 | 6/1994 | Norman et al. . | |
| 5,415,464 | 5/1995 | Scott . | |
| 5,427,171 | * 6/1995 | Prieto | 164/132 |
| 5,466,050 | * 11/1995 | Botterman et al. | 301/65 |
| 5,810,067 | 9/1998 | Atari et al. . | |
| 5,826,949 | * 10/1998 | Bortoloni | 301/97 |

FOREIGN PATENT DOCUMENTS 09253826 9/1997 (JP) .
98/47722 10/1998 (WO) .

* cited by examiner

Primary Examiner—S. Joseph Morano
Assistant Examiner—Long Bao Nguyen
(74) Attorney, Agent, or Firm—MacMillan, Sobanski & Todd, LLC

(57) ABSTRACT

A one piece commercial highway vehicle wheel cast from a light weight metal in mold having a core insert which forms a circumferential lightener recess in the outboard end of the wheel.

19 Claims, 4 Drawing Sheets

LIGHT WEIGHT CAST WHEEL AND APPARATUS FOR CASTING SAME

CROSS-REFERENCE TO RELATED APPLICATIONS

This application is a cont of International Application No. PCT/98/27817, filed Dec. 30, 1998, and claims benefit of Provisional No. 60/070,022 filed Dec. 30, 1997.

BACKGROUND OF THE INVENTION

This invention relates in general to a vehicle wheels and in particular to a light weight cast wheel for commercial highway vehicles and an apparatus for casting such a wheel.

Light weight commercial vehicle wheels formed from an aluminum alloy are becoming increasingly popular. It is known to fabricate such wheels from two pieces. A full face wheel disc is formed by a conventional process, such as casting or forging, from an alloy of a light weight metal, such as aluminum, magnesium or titanium. The wheel disc includes a centrally located wheel mounting flange and an outer annular flange which forms an outboard tire bead seat retaining flange. The centrally located wheel mounting flange has a centrally located pilot hole and a plurality of lug bolt holes spaced circumferentially around the pilot hole. The lug bolt holes receive lug bolts which carry nuts for securing the wheel on an axle of a vehicle. The outer annular flange of the disc is preferably provided with a plurality of wheel openings or windows spaced circumferentially around the pilot hole. The perimeter of the outer flange is formed into an outboard tire bead seat. An outboard tire bead retaining flange extends in an outward radial direction from the outboard end of the tire bead seat.

The wheel disc is attached to the outboard end of a partial wheel rim at the outboard tire bead seat with a continuous air-tight circumferential weld. The partial wheel rim is formed by a conventional process, such as rolling and includes a wheel well which extends in an axial inboard direction from the outboard tire bead seat. The well terminates in an inboard tire bead seat. An inboard tire bead retaining flange extends radially from the inboard end of the inboard tire bead seat. The wheel rim is usually formed from the same alloy as the wheel disc; however, the rim can be formed from a different metal. To reduce cost, the wheel rim can be rolled from steel.

Alternately, a one piece wheel can be formed by a conventional process, such as casting or forging. A one piece wheel eliminates the circumferential weld between the wheel disc and wheel rim and the potential for air leaks therethrough. However, because of the geometry of the molds or dies used, such wheels tend to have thick cross sections at the juncture of the wheel disc outer annular flange and the outboard end of the wheel rim.

SUMMARY OF THE INVENTION

This invention relates to a light weight cast wheel for a commercial highway vehicle and an apparatus for casting such a wheel.

The additional metal contained in the thick cross section of the juncture of the wheel disc outer annular flange and the outboard end of the wheel rim of a one piece wheel increases the weight of the wheel, which is added to the unsprung weight of the vehicle suspension. Accordingly, it would be desirable to include a lightener recess or plurality of lightener pockets in this portion of the vehicle wheel. Such a recess could be cut into the wheel by machining the interior of the wheel. Alternately, such recesses could be formed with movable cores which would be included in the wheel mold used to cast wheel. However, such methods are time consuming and costly. Accordingly, it would be desirable to provide a inexpensive method for forming a lightener recess in a one piece vehicle wheel.

The present invention contemplates a one piece commercial highway vehicle wheel which includes an annular rim having an outboard tire bead seat formed thereon. The wheel also includes a circular wheel disc extending across the outboard end of the wheel rim. A lightener recess is formed in the wheel rim which extends radially into the outboard end of the rim beneath the outboard tire bead seat.

In the preferred embodiment, the recess is a continuous circumferential recess. Also, the wheel is formed from an alloy of one of the group of aluminum, titanium and magnesium.

The invention also contemplates an apparatus for casting a one piece commercial highway vehicle wheel which includes a multiple-piece wheel mold having a mold base member which supports a plurality of movable side members and a movable top core. The top core cooperates with the base side members to define a mold cavity. The apparatus further includes a core insert which is carried by the top core and extends radially into the mold cavity to form a lightener recess in a wheel casting cast in the mold cavity.

It is contemplated that the core insert is annular and formed from a porous material. Additionally, the top core includes at least one vent aperture formed therethrough, the vent aperture being adjacent to the core insert. It is further contemplated that the apparatus includes a device which generates a vacuum. The vacuum generating device is connected to the vent apertures and applies a vacuum to the core insert to remove gases from the mold cavity. Furthermore, the core insert can be hollow.

The base member also can have a central sprue opening formed therethrough and be adapted for mounting upon a low pressure casting machine with the mold cavity communicating with the low pressure casting machine through the sprue opening.

The present invention also contemplates a process for casting a one piece commercial vehicle wheel which includes providing a multi-piece wheel mold having a base member supporting a plurality of movable side members and a movable top core. The mold components cooperate to define a mold cavity. A core insert is mounted within the cavity defined by the wheel mold. The wheel mold is closed and the mold cavity is charged with molten metal. The molten metal is allowed to solidify. The wheel mold is then opened and the wheel casting and core insert removed. The core insert is removed from the wheel casting and the casting finished to form a vehicle wheel. The process also can include providing a vacuum generating device which is connected thorough passageways formed in the top core to the core insert. The vacuum generating device being actuated while the molten metal solidifies to remove gases from the mold cavity.

Various objects and advantages of this invention will become apparent to those skilled in the art from the following detailed description of the preferred embodiment, when read in light of the accompanying drawings.

DESCRIPTION OF THE PREFERRED EMBODIMENT

Figure 1:
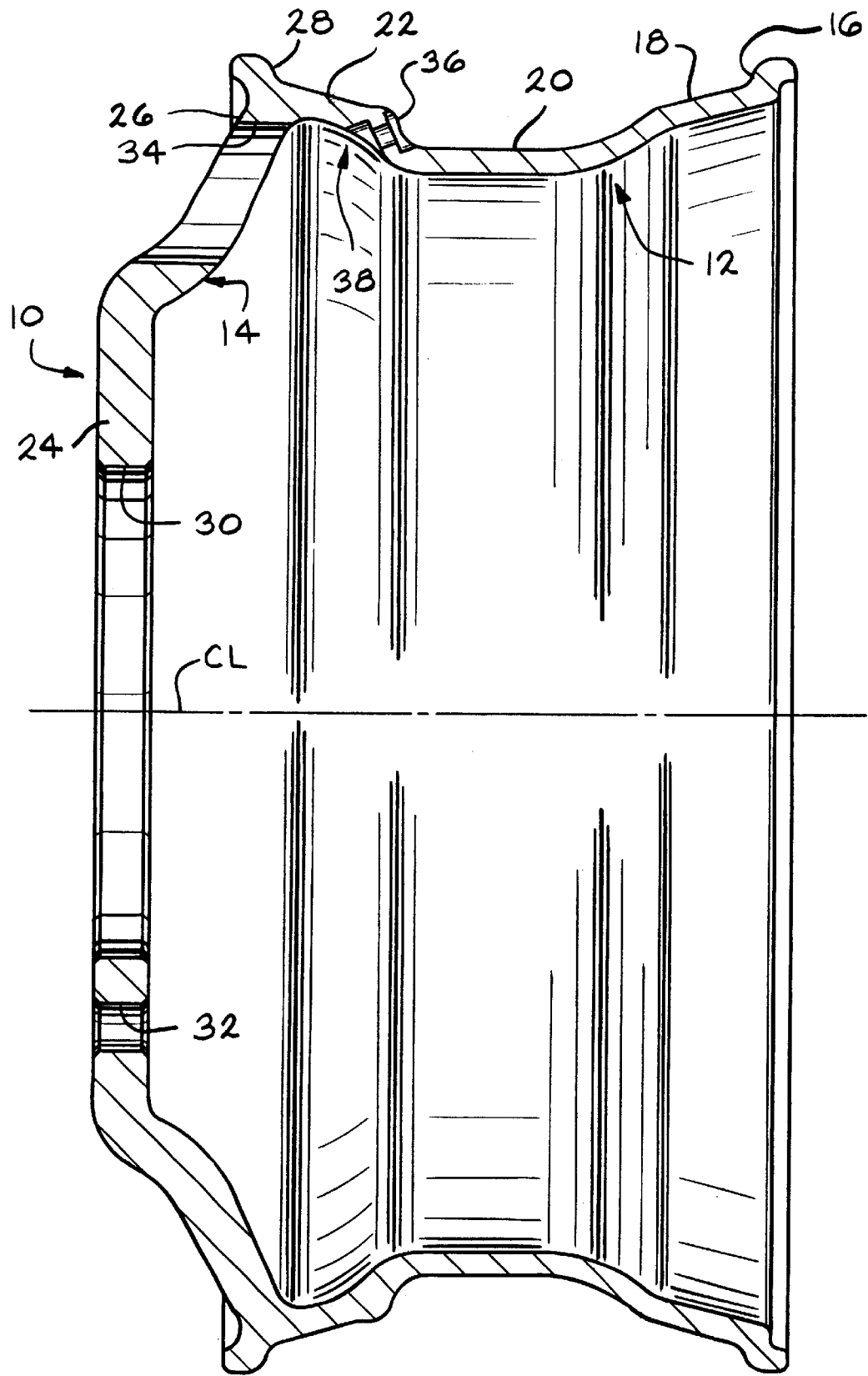
FIG. 1 is a sectional view of a cast aluminum full face style commercial highway vehicle wheel in accordance with this invention.

Referring now to the drawings, there is illustrated in FIG. 1 a sectional view of a portion of a cast aluminum full face style vehicle wheel, indicated generally at 10, in accordance with the present invention. The illustrated vehicle wheel 10 is a heavy duty cast aluminum full face style truck wheel, such as a 8.25×22.5 full face style truck wheel. However, the vehicle wheel 10 can be other than illustrated, if desired.

The cast aluminum full face style wheel 10 includes a rim 12 and a disc 14 which are integrally formed during a conventional casting process, such as a gravity or low pressure casting process. The rim 12 and the disc 14 are preferably formed from the same kind of aluminum alloy or other light weight alloy metal, such as titanium or magnesium. Alternatively, the rim 12, the disc 14, or both can be formed from different metals if desired. For example, the rim 12, the disc 14, or both the rim 12 and the disc 14 can be formed from alloys of magnesium or titanium.

The rim 12 includes an inboard tire bead seat retaining flange 16, an inboard tire bead seat 18, a generally axially extending wheel well 20, and an outboard tire bead seat 22. The disc 14 includes a generally centrally located wheel mounting flange 24, an outer annular flange 26 which extends radially to form an outboard tire bead seat retaining flange 28 of the wheel 10. The wheel mounting flange 24 is has a centrally located pilot hole 30 formed therethrough, and a plurality of lug bolt holes 32 (only one of such lug bolt holes 32 being shown) spaced circumferentially around a bolt hole circle which is concentric with the pilot hole 30. The lug bolt holes 32 receive lug bolts which carry lug nuts (not shown) for securing the wheel 10 on an axle (not shown) of a vehicle. The outer annular flange 26 of the disc 14 is preferably provided with a plurality of wheel openings or windows 34 (only one of such windows 34 being shown) spaced circumferentially around the pilot hole 30.

An aperture 36 is formed through the wheel rim 12 adjacent to one of the windows 34. The aperture 36 receives a tire valve (not shown) for inflating a pneumatic tire (not shown) mounted upon the wheel rim 12. Access to the tire valve is obtained through the window 34.

As shown in FIG. 1, the wheel 10 includes a circumferential lightener recess 38 extending radially into wheel rim 12 beneath the outboard tire bead seat 22. Accordingly, the cast full face style truck wheel 10 of this invention is considerably lighter than a similar sized forged aluminum truck wheel. Furthermore, because less metal is used, the cost of each wheel is reduced. Additionally, the wheel disc 14 extends across the outboard end of the wheel rim 12 to allow maximum room for the vehicle brake components.

Figure 2:
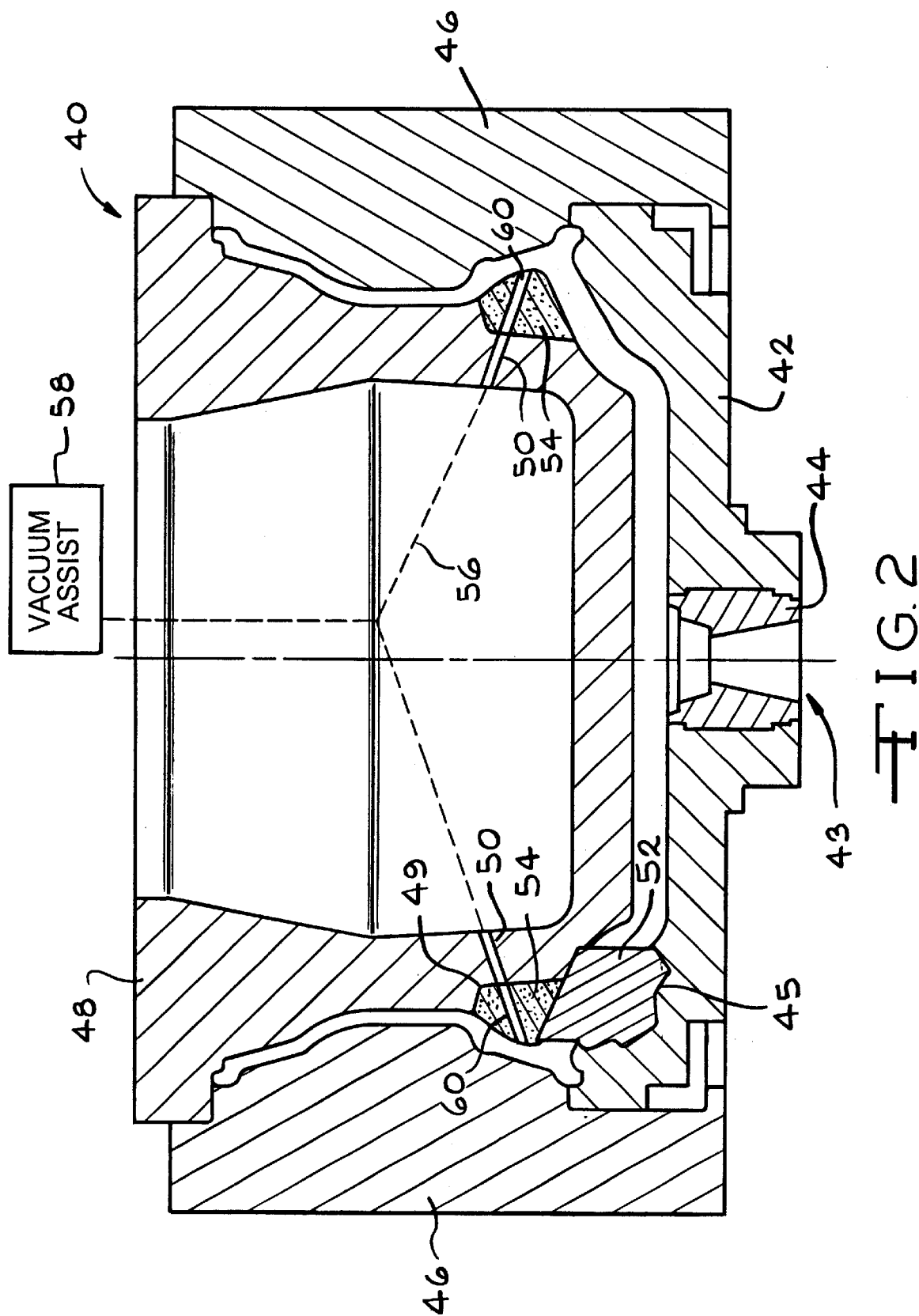
FIG. 2 is a sectional view of a portion of a mold used for producing the vehicle wheel illustrated in FIG. 1.

Turning now to FIG. 2, a multi-piece mold, indicated generally at 40, for casting the vehicle wheel 10 of this invention is shown. For illustrative purposes, the drawing of the mold 40 in FIG. 2 has been simplified. The mold 40 includes a base member 42 which, in the preferred embodiment, is mounted upon a conventional low pressure casting machine (not shown). A sprue 43 extends through the center of the base member 42. The sprue 43 is lined with a sprue insert 44 and receives metal from the low pressure casting machine. In the preferred embodiment, the base member 42 further includes a plurality of recesses 45 formed in the upper surface thereof, the purpose for which will be explained below. The recesses 45 are spaced equally about the circumference of the base member 42.

The base member 42 supports a plurality of movable side members 46. The side members 46 are movable in a horizontal direction in FIG. 2 by a conventional mechanism (not shown). The mold 40 also includes a movable cup shaped top core 48 which extends between the side members 46. The top core 48 is moveable in a vertical direction in FIG. 2 by a conventional mechanism (not shown). An annular recess 49 is formed about the base of the top core 48. A plurality of circumferentially spaced passageways 50 extend through the lower portion of the top core sides. The purpose for the passageways 50 will be described below.

A plurality of wheel window cores 52 (one shown) extend between the top core 48 and the base member 42. The window cores 52 are carried by the recesses 45 formed in the base member 42. As will be explained below, the window cores 52 form the windows in disc portion of the wheel casting. As shown in FIG. 2, the window cores 52 support an annular core insert 54. The core insert 54 is received by the annular recess 48 formed in the base of the top core 48. In the preferred embodiment, the core insert 54 is expendable and is formed from a suitable material, such as sand bound together by a resin. Alternately, a reusable core insert 54 formed from a suitable material, such as a metal, can be used. While the preferred embodiment uses a one piece core insert 54, it also is contemplated that a segmented core insert comprised of a plurality of individual core insert members (not shown) can be used. The core insert 54 is effective to form the circumferential lightener recess 38 in the wheel 10 described above.

The invention further contemplates that the mold 40 includes a venting system to remove the gases produced during the casting process to the atmosphere. The venting system is shown schematically by dashed lines in FIG. 2. The venting system includes a gas manifold 56 which is connected to the inner end of the passageways 50 formed through the top core 48. The gas manifold 56 can optionally be connected to a vacuum assist device 58 which would draw gases from the mold. In the preferred embodiment, the passageways 50 communicate with a plurality of corresponding passageways 60 formed in the core insert 54. In the preferred embodiment, a plurality of recesses 61 are formed in the lower surface of the core insert 54. The recesses 61 receive the upper end of the window cores 52 and thereby position the core insert 54 in the mold 40 with the core insert passageways 60 aligned with the corresponding top core passageways 50.

In order to force the gas produced during the casting process to the venting system, the core insert 54 can be modified so as to force the gas to the venting system. To accomplish this, selected surfaces of the core insert 54 can be painted to seal off the gas and direct it to the venting system. Alternatively, other methods can be used to force the gas to the venting system.

The core insert passageways 60 are preferably provided when the core insert 54 is formed as a solid one-piece core insert. However, the passageways 60 may not be necessary depending upon the particular mold 40 and/or core insert 54 which is used. For example, if the core insert is segmented (not shown), the passageways 60 may be eliminated if desired. Alternately, porous plugs (not shown) can be formed in the core insert 54 in place of the passageways 60.

Figure 3:
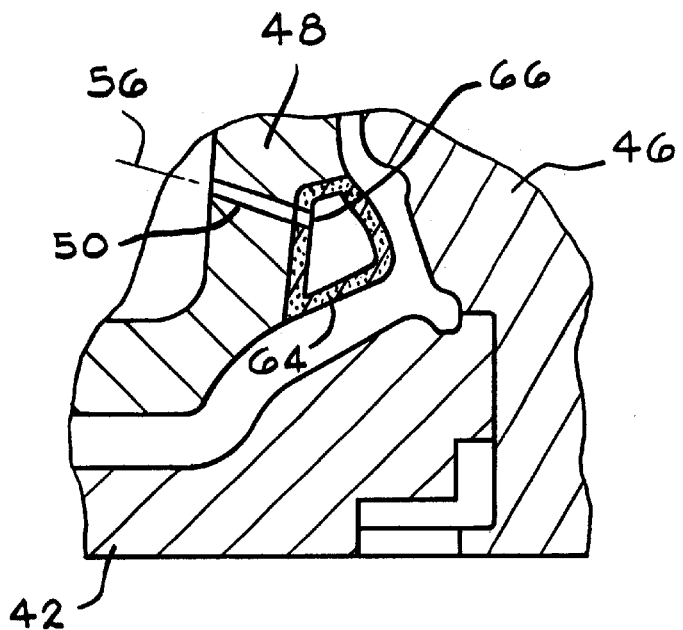
FIG. 3 is a fragmentary sectional view of the mold shown in FIG. 2 which illustrates an alternate embodiment of the invention.

An alternate embodiment of the core insert is shown at 64 in FIG. 3. Components shown in FIG. 3 which are similar to components shown in FIG. 2 have the same numerical designators. The core insert 64 is hollow and has a plurality of insert passageways 66 formed therethrough which correspond to the top core passageways 50. The core 64 can be formed by partially curing the resin binding the sand together. Only the outer layer of the core 64 is hardened and the interior sand can then be removed. With the hollow core 64, a vacuum can be drawn on the interior thereof to remove the gases formed during the casting process from the mold. Additionally, a plurality of porous plugs can be cast into the insert 64 in place of the insert passageways 66.

Figure 4:
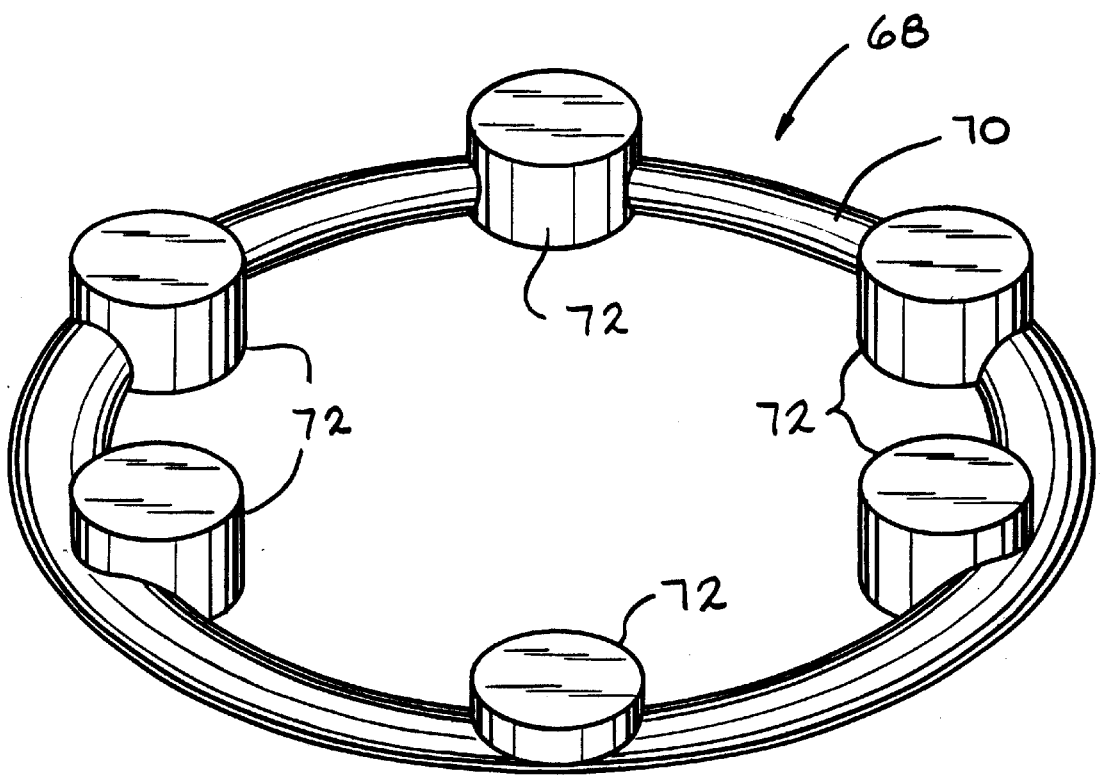
FIG. 4 is illustrates an alternate core for casting the wheel shown in FIG. 1.

Another alternate embodiment of the core insert is shown at 68 in FIG. 4. The core insert 68 is viewed generally from below in FIG. 4. The core insert 68 includes an annular portion 70, which can be solid or hollow, as described above. The insert 68 can include a plurality of passageways (not shown) formed therein for removal of gases. A plurality of generally cylindrical bosses 72 extend from the lower surface of the annular portion 70. The invention contemplates that the bosses 72 form the windows in the disc portion of the wheel casting. Accordingly, the window cores 52 described above are not needed when the core insert 68 is used. In the preferred embodiment, the lower end of the bosses are received by corresponding recesses formed in the base member 42 to position the core insert 70 within the mold 40.

Figure 5:
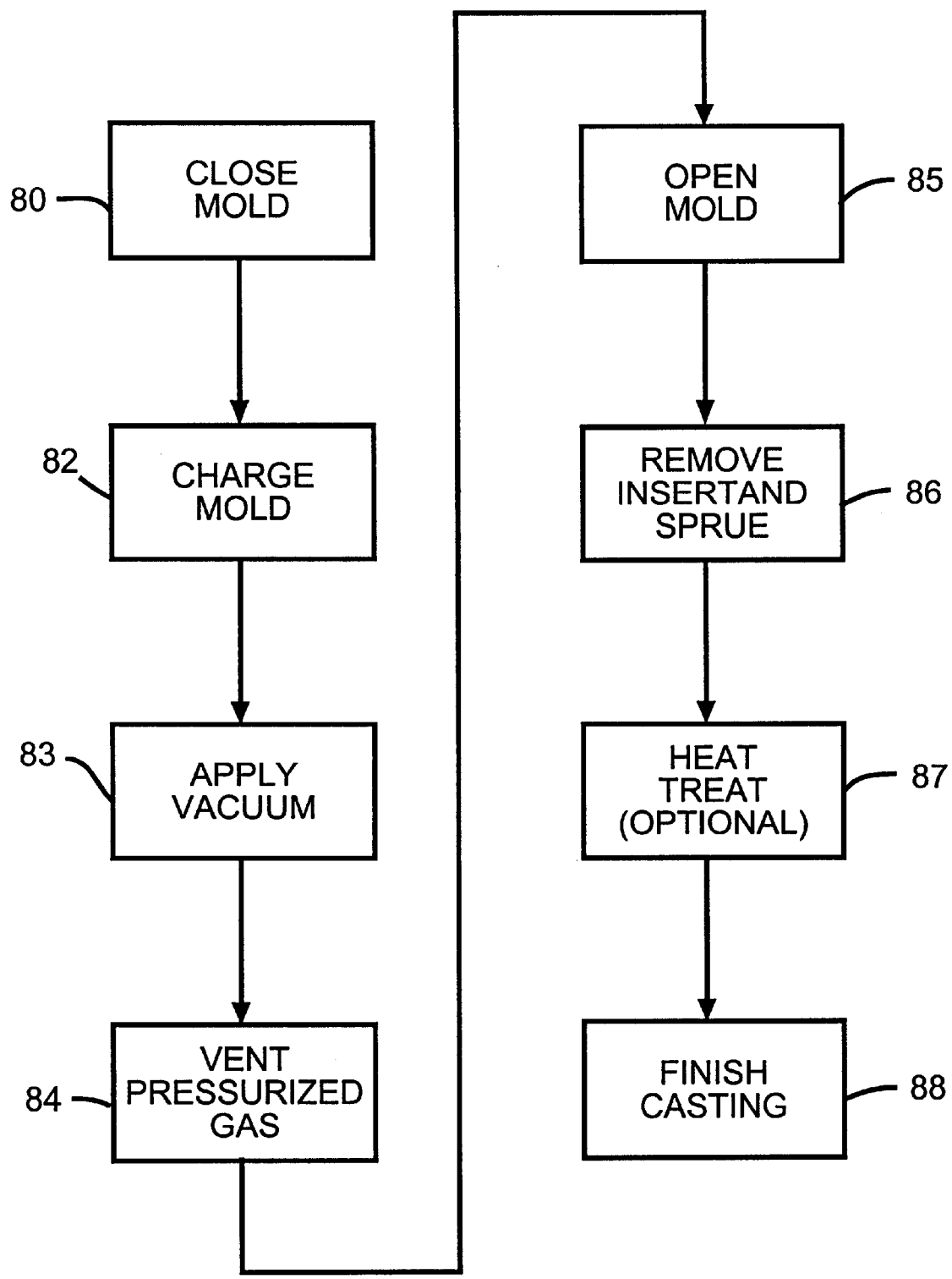
FIG. 5 is a flow chart for a process for casting the wheel shown in FIG. 1.

The present invention also contemplates a method for casting the vehicle wheel 10. The method is illustrated by the flow chart shown in FIG. 5. In functional block 80, the mold side members 46 and top core 48 are extended their closed positions. When closed, the base member 42 cooperates with the side members 46 and the top core 48 to define a mold cavity.

As described above, in the preferred embodiment, the mold is mounted upon a low pressure casting machine. A typical low pressure casting machine includes a thermally insulated chamber which holds a pool of molten metal. A filler tube extends through a side of the chamber from above the maximum height of the metal pool. A removable filler cap is mounted upon the upper end of the filler tube. When closed, the filler cap forms an air-tight seal for the lower chamber. A plurality of ports are formed through the chamber walls to allow pressurization and venting of the chamber.

The mold 40 is mounted above the chamber; however, the chamber is not necessarily positioned below the mold 40. A hollow fill tube, or stalk, extends from the mold sprue 43 and through the top of the casting machine chamber. The lower end of the stalk extends into the pool of molten metal contained in the chamber. The upper end of the stalk communicates with the mold cavity defined by the closed mold.

In functional block 82 the mold is charged. During charging, the filler cap is opened and molten metal poured into the filler tube to fill the chamber of the low pressure casting machine to the level of the lower end of the filler tube. The filler tube is then cleared of molten metal and the filler cap closed and sealed. Pressurized gas is introduced into the chamber and forces molten metal up the stalk and into the mold cavity. The pressure is maintained while the molten metal in mold cavity solidifies.

The vacuum assist is applied in functional block 83 to remove gases generated during the casting process. For example, the resin which binds together the material forming core insert 54 is burned by the molten metal and forms combustion gases. Unless the combustion gasses are removed, the combustion gases can form bubbles in the wheel casting.

In functional block 84, the pressurized gas is vented from the chamber of the low pressure casting machine. In functional block 85, the mold 40 is opened to allow removal of the wheel casting from the mold cavity. (The mold 40 would then be re-closed and the casting machine chamber re-pressurized to cast another wheel.)

The core insert 54 and sprue are removed from the wheel casting in functional block 86. The wheel casting is then heat treated in functional block 87; however, this step is optional. The wheel casting is finished in functional block 88. The finishing includes machining the wheel to its final shape and drilling the pilot and wheel lug holes through the wheel disc. Also, optional decorative and/or clear coatings can be applied to the wheel surface.

While the preferred embodiment of the invention has been illustrated and described for a low pressure casting process, it will be appreciated that other processes can be utilized. For example, it also is contemplated that the wheel can be formed with a counter casting process. In a counter casting process, the mold is enclosed within an air-tight chamber (not shown). Both the chamber and the furnace are pressurized. The furnace pressure is increased while the chamber pressure is decreased to charge the mold cavity with molten metal. By regulating the furnace and chamber pressures, the filling of the mold cavity is controlled.

While the preferred embodiments of the invention have been described above as having a plurality of separate window cores or forming the window cores as portions of the core insert, it will be appreciated that the invention also can be practiced with the window cores formed as bosses extending form the upper surface of the mold base member.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment has been described as including a porous core insert which provides for removal of gases formed during casting operations, the invention also can be practiced with a non-porous insert.

What is claimed is:

1. A one piece commercial highway vehicle wheel comprising:
    an annular rim, said rim having an outboard tire bead seat formed thereon;
    a circular wheel disc extending across an outboard end of said rim; and
    a lightener recess formed in said wheel rim, said recess extending radially into said outboard end of said rim beneath said outboard tire bead seat, and wherein said recess is a continuous circumferential recess that extends continuously around an entire circumference of said wheel rim.

2. A vehicle wheel according to claim 2 wherein the wheel is formed from an alloy of one of the group of aluminum, titanium and magnesium.

3. A vehicle wheel according to claim 1 wherein said outer annular portion of said wheel disc includes a plurality of windows formed therein.

4. A vehicle wheel according to claim 1 wherein said wheel rim and said wheel disc are formed from different metals.

5. A vehicle wheel according to claim 1 wherein said inner annular wheel mounting portion of said wheel disc includes a generally centrally located pilot hole and a plurality of lug bolt holes spaced circumferentially around said pilot hole.

6. A vehicle wheel according to claim 1 wherein said wheel rim defines a generally constant thickness throughout the entire length thereof.

7. A vehicle wheel according to claim 1 wherein said outer annular portion of said wheel disc includes a plurality of windows formed therein, said windows and said lightener recess formed by a single core insert during the wheel casting process.

8. A one piece full face style cast vehicle wheel comprising:

a wheel rim including an outboard tire bead seat, a generally axially extending well, an inboard tire bead seat, and an inboard tire bead seat retaining flange; said outboard tire bead seat including an inner surface and defining an outboard end;

a full face wheel disc including an inner annular wheel mounting portion and an outer annular portion which defines at least a portion of an outboard tire bead seat retaining flange of the vehicle wheel, said outer annular portion including an inner surface; and a continuously extending uninterrupted circumferential lightener recess extending radially into said vehicle wheel beneath said outboard tire bead seat of said wheel rim at the juncture of said inner surface of said outboard end of said wheel rim and said inner surface of said outer annular portion of said wheel disc, said recess extending continuously around an entire circumference of said vehicle wheel.

9. A vehicle wheel according to claim 8 wherein said outer annular portion of said wheel disc includes a plurality of windows formed therein.

10. A vehicle wheel according to claim 8 wherein said wheel rim and said wheel disc are formed from different metals.

11. A vehicle wheel according to claim 8 wherein said inner annular wheel mounting portion of said wheel disc includes a generally centrally located pilot hole and a plurality of lug bolt holes spaced circumferentially around said pilot hole.

12. A vehicle wheel according to claim 8 wherein said wheel rim defines a generally constant thickness throughout the entire length thereof.

13. A vehicle wheel according to claim 8 wherein said outer annular portion of said wheel disc includes a plurality of windows formed therein, said windows and said lightener recess formed by a single core insert during the wheel casting process.

14. A vehicle wheel according to claim 8 wherein said wheel is formed from an alloy of one of the group of aluminum, titanium and magnesium.

15. A one piece full face style cast vehicle wheel comprising:

a wheel rim including an outboard tire bead seat, a generally axially extending well, an inboard tire bead seat, and an inboard tire bead seat retaining flange; said outboard tire bead seat including an inner surface and defining an outboard end;

a full face wheel disc including an inner annular wheel mounting portion and an outer annular portion which defines at least a portion of an outboard tire bead seat retaining flange of the vehicle wheel, said outer annular portion including an inner surface, said inner annular wheel mounting portion including a generally centrally located pilot hole and a plurality of lug bolt holes spaced circumferentially around said pilot hole, said outer annular portion of said wheel disc including a plurality of windows formed therein; and a continuously extending uninterrupted circumferential lightener recess extending radially into said vehicle wheel beneath said outboard tire bead seat of said wheel rim at the juncture of said inner surface of said outboard end of said wheel rim and said inner surface of said outer annular portion of said wheel disc, said recess extending continuously around an entire circumference of said vehicle wheel.

16. A vehicle wheel according to claim 15 wherein said wheel is formed from an alloy of one of the group of aluminum, titanium and magnesium.

17. A vehicle wheel according to claim 15 wherein said wheel rim and said wheel disc are formed from different metals.

18. A vehicle wheel according to claim 15 wherein said wheel rim defines a generally constant thickness throughout the entire length thereof.

19. A vehicle wheel according to claim 15 wherein said windows and said lightener recess are formed by a single core insert during the wheel casting process.

* * * * *

UNITED STATES PATENT AND TRADEMARK OFFICE
CERTIFICATE OF CORRECTION

PATENT NO.     : 6,315,367 B1
DATED          : November 13, 2001
INVENTOR(S)    : Garth Lawrence et al.

It is certified that error appears in the above-identified patent and that said Letters Patent is hereby corrected as shown below:

<u>Column 6,</u>
Line 62, after "claim" delete "2" and insert -- 1 --.

Signed and Sealed this

Fourteenth Day of May, 2002

Attest:

Attesting Officer

JAMES E. ROGAN
*Director of the United States Patent and Trademark Office*